US009389486B1

(12) United States Patent
Goddard et al.

(10) Patent No.: US 9,389,486 B1
(45) Date of Patent: *Jul. 12, 2016

(54) ENCLOSURE DEVICE

(71) Applicant: Vizient, L.L.C., Bettendorf, IA (US)

(72) Inventors: Brad J. Goddard, Bettendorf, IL (US); Mark A. Hann, LeClaire, IA (US)

(73) Assignee: Lincoln Global, Inc., City of Industry, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,832

(22) Filed: Dec. 20, 2013

Related U.S. Application Data

(63) Continuation-in-part of application No. 14/037,066, filed on Sep. 25, 2013, which is a continuation of application No. 12/849,312, filed on Aug. 3, 2010, now Pat. No. 8,571,398.

(60) Provisional application No. 61/273,268, filed on Aug. 3, 2009, provisional application No. 61/740,355, filed on Dec. 20, 2012.

(51) Int. Cl.
G03B 17/02 (2006.01)
B23P 13/00 (2006.01)
G03B 11/04 (2006.01)

(52) U.S. Cl.
CPC ............... *G03B 17/02* (2013.01); *B23P 13/00* (2013.01); *G03B 11/041* (2013.01); *Y10S 901/42* (2013.01)

(58) Field of Classification Search
USPC .............................. 396/25, 28, 448
See application file for complete search history.

(56) References Cited

U.S. PATENT DOCUMENTS

| 3,836,985 | A | 9/1974 | Lange |
| 4,492,847 | A | 1/1985 | Masaki et al. |
| 4,599,018 | A | 7/1986 | Woods |
| 4,649,426 | A | 3/1987 | Bolstad |
| 4,728,974 | A | 3/1988 | Nio et al. |
| 4,868,649 | A | 9/1989 | Gaudin |
| 4,918,517 | A | 4/1990 | Burgoon |
| 5,038,292 | A | 8/1991 | Okumura et al. |
| 5,255,088 | A | 10/1993 | Thompson |
| 5,391,137 | A | 2/1995 | Depoy et al. |
| 5,520,371 | A | 5/1996 | Miller et al. |
| 5,694,839 | A | 12/1997 | Wohl et al. |
| 6,229,569 | B1 | 5/2001 | Saito et al. |
| 6,293,183 | B1 | 9/2001 | Noda |

(Continued)

*Primary Examiner* — Minh Phan
(74) *Attorney, Agent, or Firm* — Hamilton IP Law, PC; Jay R. Hamilton; Charles A. Damshen

(57) ABSTRACT

In one embodiment of an enclosure device, a camera casing and light source casing are secured to a plate frame, and the enclosure device is configured to be mounted to an arm, such as a robotic welding arm. A shutter mounting arm may also be secured to the plate frame. A flap may be pivotally mounted to the distal end of the shutter mounting arm, such that the flap may be actuated between a first and second position by an actuator cooperatively engaged with the flap. The first position may be defined as to protect a camera lens positioned in the camera casing and a light source lens positioned in the light source casing. The second position may be defined as to not obscure a line-of-sight from either the light source and/or the camera to the work piece on the arm. A light source casing may be sandwiched between two side plates that are generally configured as mirror images of one another. The light source casing housing a light source may be configured as a laser designed to measure distances.

15 Claims, 9 Drawing Sheets

(56) References Cited

U.S. PATENT DOCUMENTS

| | | |
|---|---|---|
| 6,308,821 B1 | 10/2001 | Asai et al. |
| 6,318,951 B1 | 11/2001 | Schmidt et al. |
| 7,633,548 B2 | 12/2009 | Misawa |
| 8,571,398 B1 | 10/2013 | Goddard et al. |
| 2002/0071050 A1 | 6/2002 | Holmberg |
| 2002/0186304 A1* | 12/2002 | Kono et al. ............... 348/216.1 |
| 2004/0263666 A1 | 12/2004 | Tsuji et al. |
| 2005/0107004 A1 | 5/2005 | Brown et al. |
| 2009/0231423 A1 | 9/2009 | Becker et al. |
| 2010/0201803 A1 | 8/2010 | Melikian |

* cited by examiner

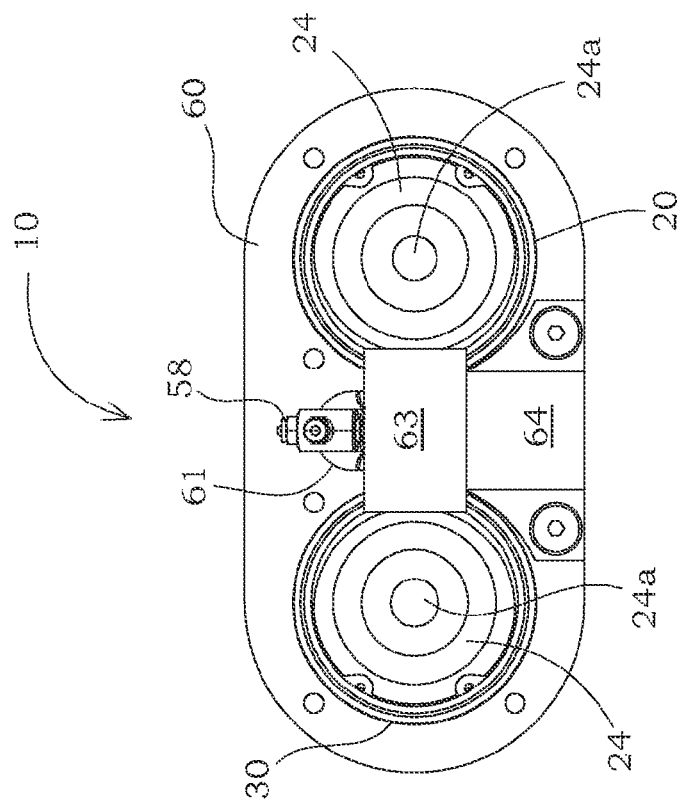
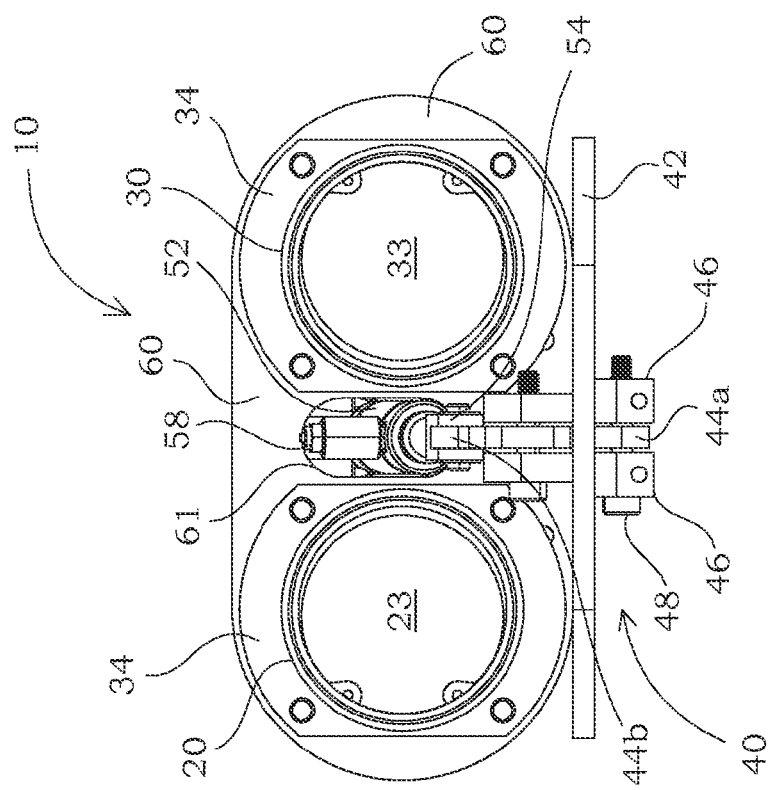
FIG. 3B
FIG. 3A

ENCLOSURE DEVICE

CROSS REFERENCE TO RELATED APPLICATIONS

This application claims priority from and is a continuation-in-part of U.S. patent application Ser. No. 14/037,066 filed on Sep. 25, 2013, which claims priority from and is a continuation of U.S. patent application Ser. No. 12/849,312 filed on Aug. 3, 2010 (now U.S. Pat. No. 8,571,398), which application claimed priority under 35 U.S.C. §119(e) of provisional U.S. Pat. App. Ser. No. 61/273,268 filed on Aug. 3, 2009, all of which are incorporated by reference herein in their entireties. This application also claims priority under 35 U.S.C. §119(e) of provisional U.S. Pat. App. Ser. No. 61/740,355 filed on Dec. 20, 2012, which is incorporated by reference herein in its entireties.

FIELD OF INVENTION

The present invention relates to an enclosure device for protecting items positioned within the device, and more specifically, to an enclosure device for a camera and light source, wherein the enclosure device includes a shutter.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 3A is a front plane view of one embodiment of the enclosure device with the shutter open.

FIG. 3B is a rear plane view of one embodiment of the enclosure device.

DETAILED DESCRIPTION - LISTING OF ELEMENTS

Figure 1:
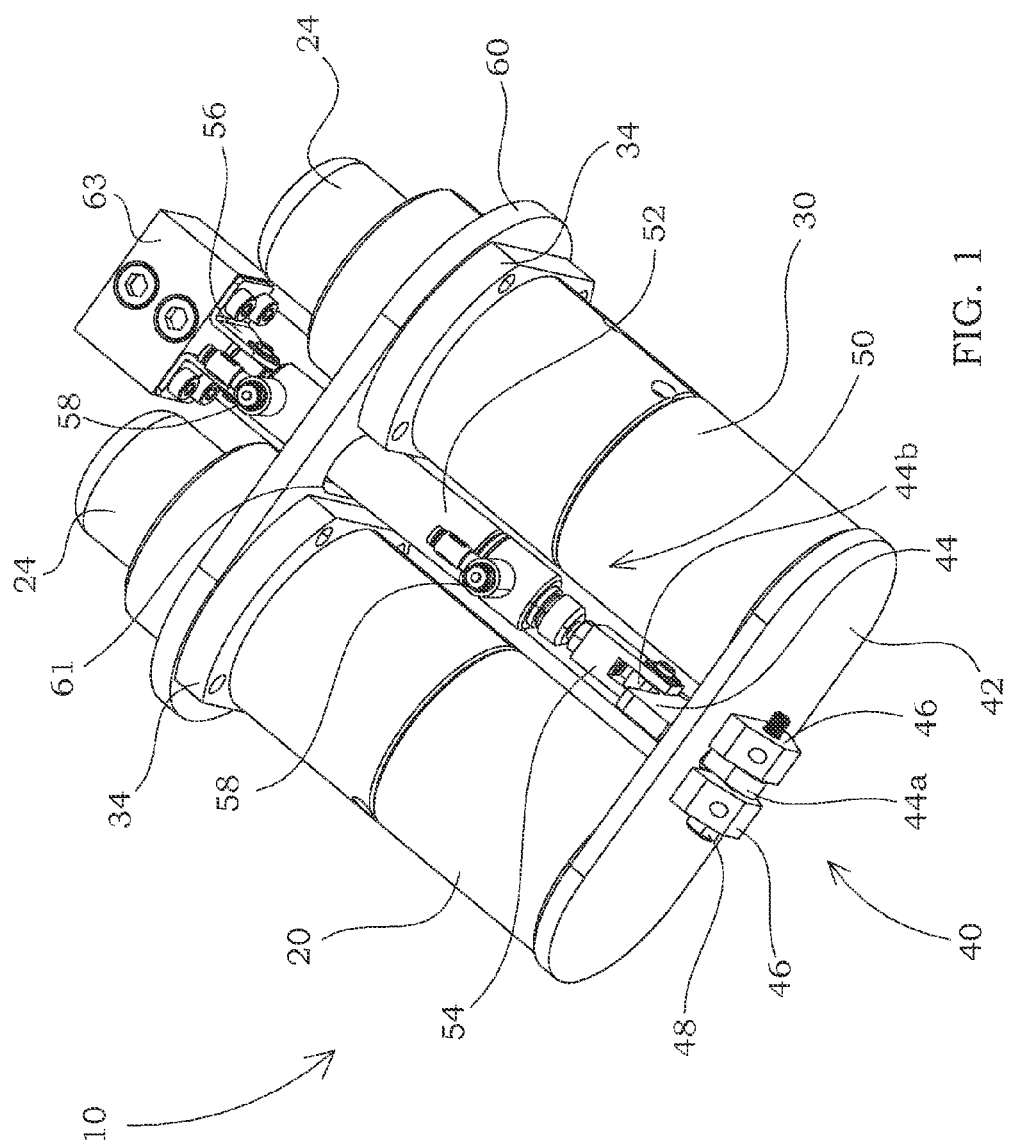
FIG. 1 is a perspective view of one embodiment of the enclosure device with the shutter closed.

| ELEMENT DESCRIPTION | Element No. |
|---|---|
| Enclosure Device | 10 |
| Arm | 12 |
| Weld tip | 14 |
| Screw | 16 |
| Camera casing | 20 |
| Camera | 22 |
| Camera lens | 23 |
| Sealing cap | 24 |
| Sealing cap aperture | 24a |
| Light source casing | 30 |
| Light source | 32 |
| Light source lens | 33 |
| Flange | 34 |
| Shutter mechanism | 40 |
| Flap | 42 |
| Flap slot | 42a |
| Translator | 44 |
| Flap connector | 44a |
| Actuator connector | 44b |
| Mounting arm connector | 44c |
| Plate connector | 44d |
| Connector block | 46 |
| Connector pin | 48 |
| Actuator | 50 |
| Actuator body | 52 |
| Actuator arm | 54 |
| Actuator base | 56 |
| Fluid port | 58 |
| Plate frame | 60 |
| Actuator aperture | 61 |
| Casing aperture | 62 |
| Actuator mount | 63 |
| Rear block | 64 |
| Adaptor plate | 66 |
| Side plate | 67 |
| Cross member | 67a |
| Shutter mounting arm | 68 |
| Translator pivot | 68a |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 4:
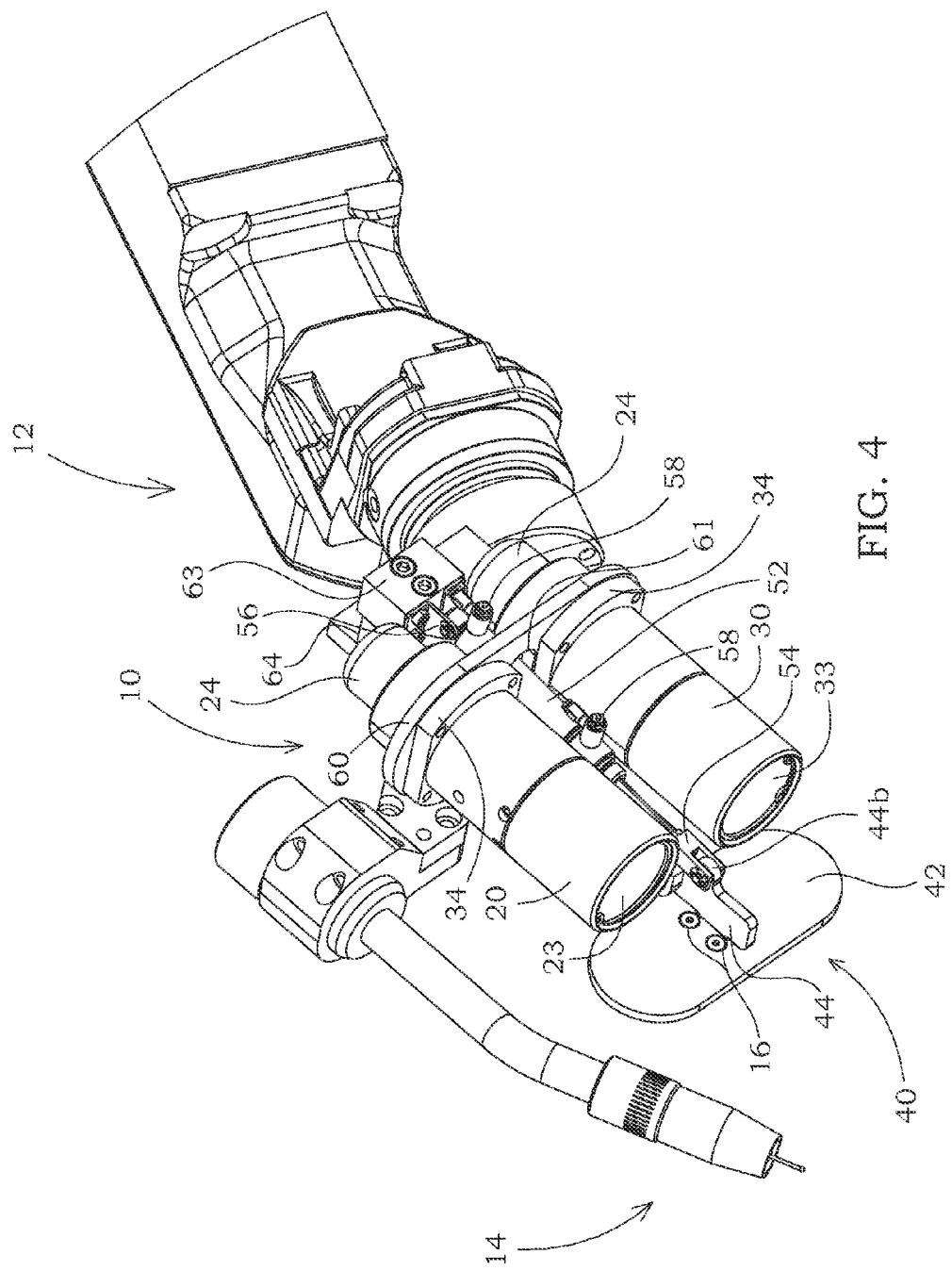
FIG. 4 is a perspective view of one embodiment of the enclosure device mounted to an arm, wherein the shutter is open.

Referring now to the drawings, wherein like reference numerals designate identical or corresponding parts throughout the several views, FIG. 1 provides a perspective view of one embodiment of an enclosure device 10 with the flap 42 in the closed position. Generally, the enclosure device 10 allows a user to protect a camera and/or camera lens 23 from damage during welding or other operations performed by a work piece adjacent the distal end of an arm 12, which operations may be performed on any piece of material. One embodiment of the enclosure device 10 affixed to an arm 12 with a weld tip 14 thereon is shown in FIG. 4. Although the illustrative embodiments of the enclosure device 10 are specifically adapted for use with welding, other embodiments may be adapted for sue with arms 12 performing other functions, including but not limited to drilling, boring, cutting, and/or combinations thereof. Accordingly, the scope of the enclosure device 10 is not limited by the type of work the arm 12 performs. Additionally, the enclosure device 10 may be mounted on structures other than arms 12 without limitation.

Figure 2:
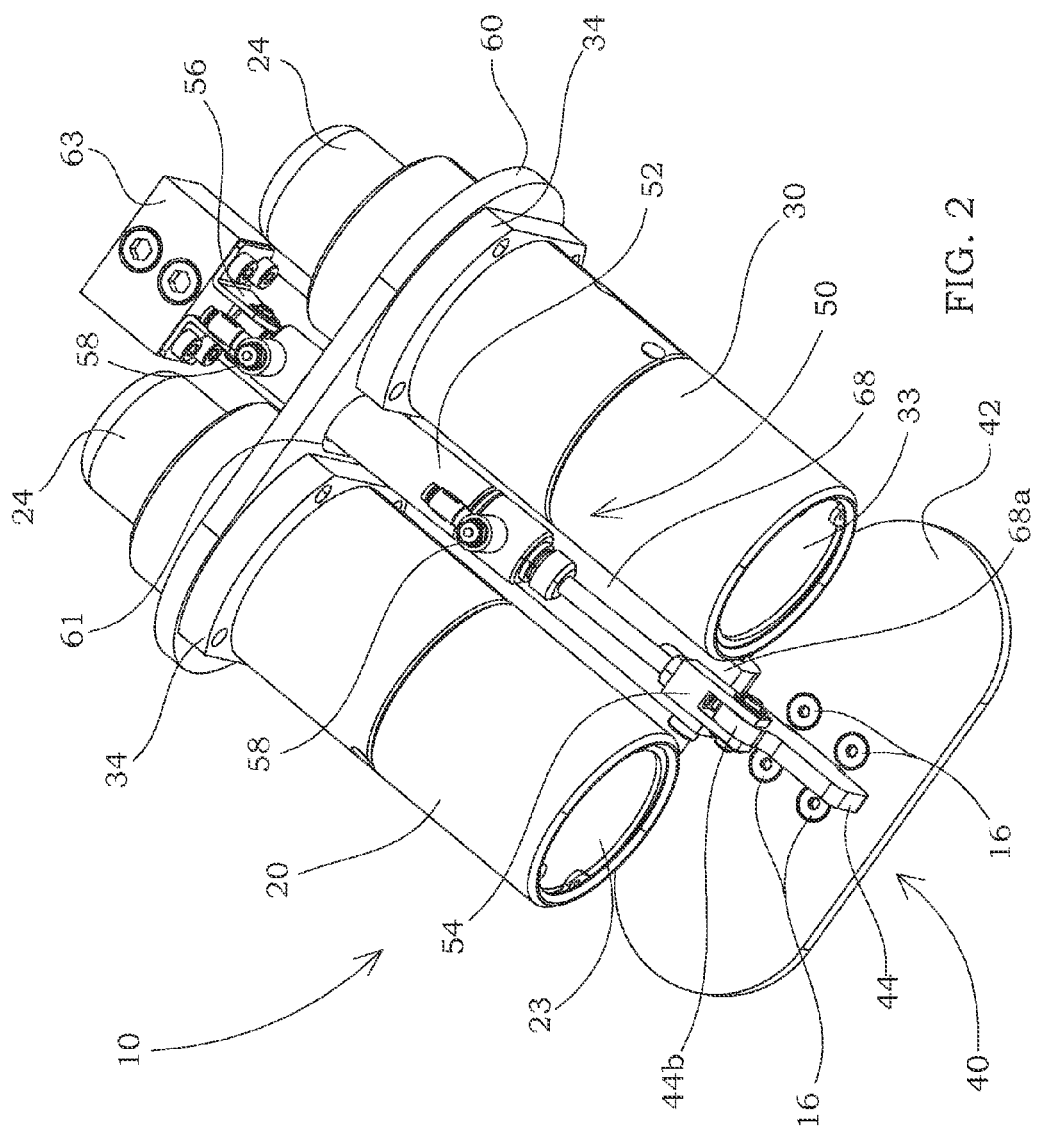
FIG. 2 is a perspective view of one embodiment of the enclosure device with the shutter open.

As shown in FIGS. 1 and 2, the illustrative embodiment of the enclosure device 10 includes a camera casing 20 and a light source casing 30, which are oriented parallel with respect to one another. The camera casing 20 and light source casing 30 are configured to be parallel to provide the enclosure device 10 with a lower profile. In the illustrative embodiment, the casings 20, 30 are virtually identical, but in other embodiments the casings 20, 30 may have differing dimensions, configurations, and/or orientations (with respect to one another or with respect to those shown in the illustrative embodiment) without departing from the spirit and scope of the enclosure device 10. Either casing 20, 30 may be constructed of several pieces that are later joined to one another.

A camera lens 23 may be mounted in the end of the camera casing 20 adjacent the flap 42. A light source lens 33 may be mounted in the end of the light source casing 30 adjacent the flap 42. Both the camera lens 23 and light source lens 33 may be transparent such that a camera 22 may be positioned in the camera casing 20, and a light source 32 may be positioned in the light source casing 30. The lens 23, 33 may be formed from glass, polymer materials, or any other suitable material without limitation.

A sealing cap 24 may be positioned on the end of each casing 20, 30 opposite the flap 42. The sealing cap 24 may be formed with a sealing cap aperture 24a therein. The sealing cap serves to hermetically seal the interior of the casings 20, 30, while the sealing cap aperture 24a provides an inlet/outlet for various conduits from the exterior environment to the interior of the casings 20, 30. Such conduits include but are not limited to electrical conduit to provide power to the camera 22 and/or light source 32, information conduits to relay information from the camera 32 to an external location, and pressurized fluid conduits that may be used to deliver a cooled, pressurized fluid stream to the interior of the casings 20, 30. It is contemplated that most applications for the enclosure device 10 will require sealing caps 24 having sealing cap apertures 24a that hermetically seal the interior of the casings 20, 30 from the exterior environment.

Figure 5:
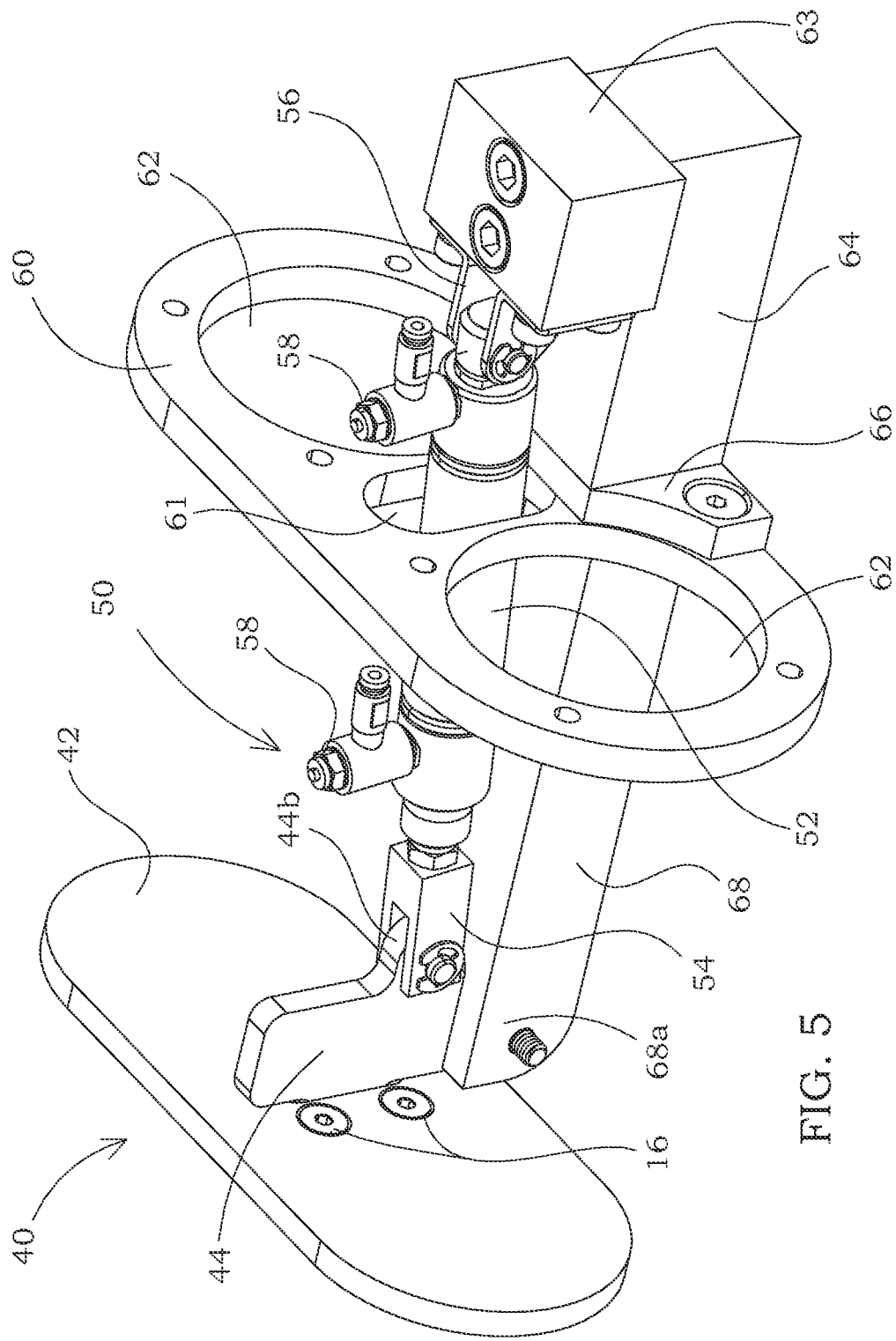
FIG. 5 is a perspective view of one embodiment of the enclosure device with the camera and light source casings and camera and light source removed for clarity.

A detailed view of the support structure for the illustrative embodiment of the enclosure device 10 is shown in FIG. 5. As shown, the plate frame 60 in the illustrative embodiment is formed with two casing apertures 62 therein. The casing apertures 62 are configured to accept one of the two casings 20, 30 previously described. In the illustrative embodiment, a flange 34 on each casing 20, 30 abuts the respective casing aperture 62, and screws are used to affix the flange 34 to the plate frame. However, each casing 20, 30 may be secured to the plate frame 60 using any suitable structure and/or method, including but not limited to chemical adhesives, welding, rivets, pins, screws, and/or combinations thereof, and flanges 34 may not be necessary in other embodiments. An actuator aperture 61 may also be positioned in the plate frame 60, which is show oriented between the two casing apertures 62 in the illustrative embodiment.

A shutter mounting arm 68 may be affixed to one face of the plate frame 60, and an adaptor plate 66 may be affixed to the opposite face thereof using any suitable method and/or structure. The shutter mounting arm 68 is configured to extend out from the plate frame 60, and may be configured with a translator pivot 68a at the distal end of the shutter mounting arm 68. In the illustrative embodiment, the translator pivot 68a is simply configured as vertical groove into which the mounting arm connector 44c may fit, which is described in detail below. A rear block 64 may be affixed to the face of the adaptor plate 66 opposite the plate frame 60 using any method and/or structure suitable for the particular application of the enclosure device 10. An actuator mount 63 may be affixed to the top side of the rear block 64 as oriented in FIG. 5 using any method and/or structure suitable for the application.

Figure 6:
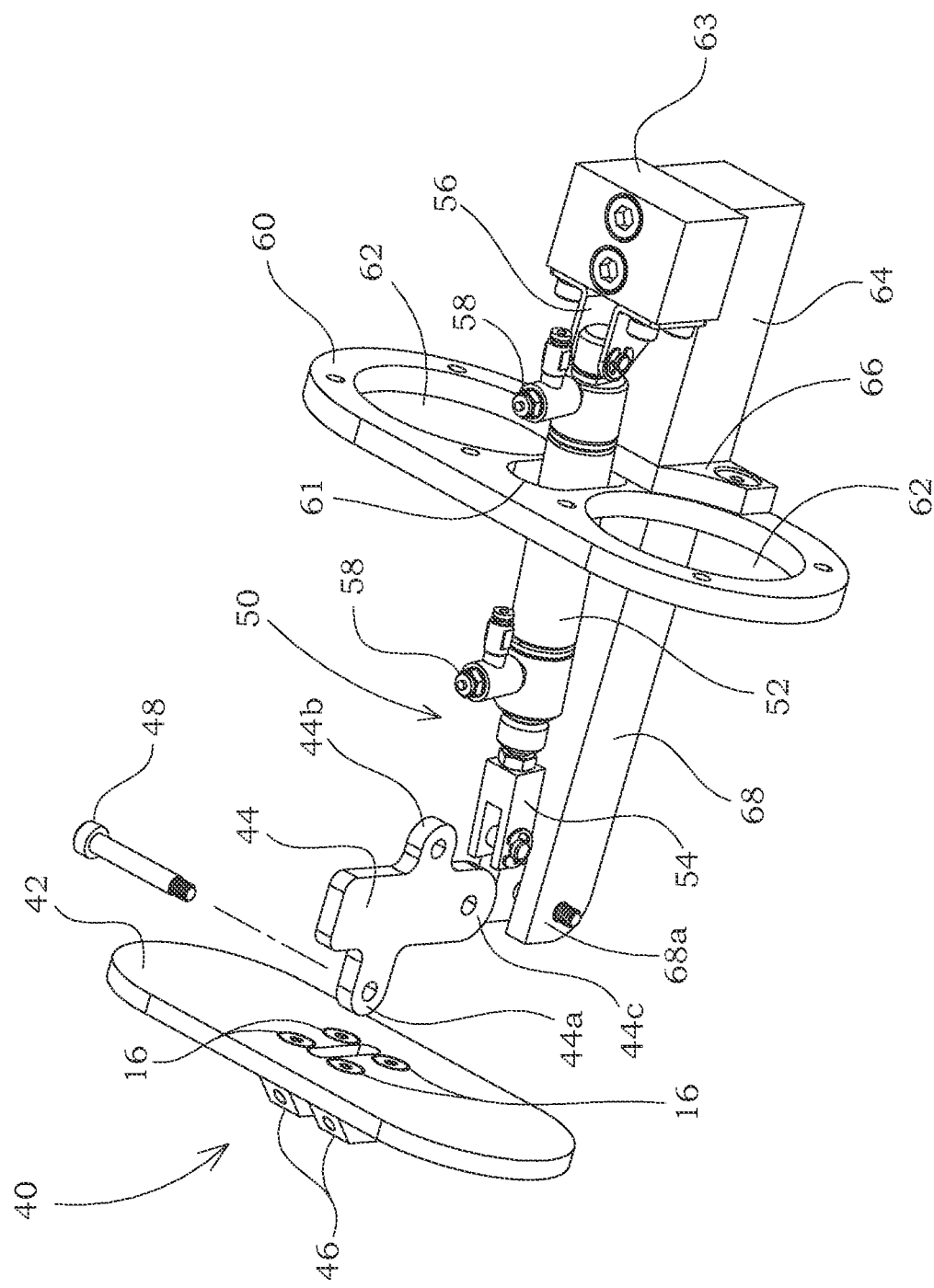
FIG. 6 is a detailed exploded view of one embodiment of the shutter mechanism.

As best shown in FIG. 6, a translator 44 may be pivotally engaged with the shutter mounting arm 68 at the translator pivot 68a. In the illustrative embodiment of the enclosure device 10 this pivotal engagement is achieved through a tongue-and-groove arrangement, wherein the mounting arm connector 44c functions as the tongue, wherein a pin extends through the translator pivot 68a and the mounting arm connector 44c.

The translator 44 may also be formed with a flap connector 44a. The flap connector 44a may be configured to pass through a flap slot 42a formed in the flap 42, as best shown in FIG. 6. In the illustrative embodiment, the translator 44 is secured to the flap 42 via two connector blocks 46 positioned on either side of the flap slot 42a and a connector pin 48 passing through an aperture in each connector block 46 and another aperture in the flap connector 44a. Accordingly, mechanical forces placed upon the translator 44 may be directly communicated to the flap 42. In the illustrative embodiment, the connector blocks 46 are affixed to the flap 42 via a plurality of screws 16, but any suitable method and/or structure may be used without departing from the spirit and scope of the enclosure device 10. This arrangement allows the flap 42 to be replaced simply by removing the connector pin 48. Accordingly, as the flap 42 becomes damaged and/or worn due to use, it may be changed using minimal effort.

The translator may be formed with an actuator connector 44b opposite the flap connector 44a, which is best shown in FIG. 6. The actuator connector 44b is configured in a manner similar to that of the flap connector 44a and mounting arm connector 44c. The actuator connector 44b provides a pivotal connection point between the actuator 50 and the translator 44. The actuator connector 44b may be configured to fit within a groove formed on the actuator arm 54 to create a tongue-and-groove arrangement similar to that previously described for the mounting arm connector 44c and translator pivot 68a.

The actuator body 52 may be secured to an actuator base 56, as shown in FIGS. 5 & 6. In turn, the actuator base 56 may be secured to the actuator mount 63 described above. Using an actuator base 56 simplifies the removal and/or replacement of the actuator 50, but other embodiments of the enclosure device 10 do not employ an actuator base 56. The actuator 50 may be configured such that the actuator body 52 passes through the actuator aperture 61 formed in the plate frame 60. If the actuator 50 is operated via pressurized fluid, as shown for the illustrative embodiment, one or more fluid ports 58 may be positioned on the actuator body 52. However, electrical actuators 50 will not require fluid ports 58.

As will be apparent in light of the preceding description and figures, the actuator 50 causes the flap 42 to move between first and second positions, FIG. 1 shows the flap 42 in a first position, wherein the flap 42 is closed (I.e., positioned immediately adjacent the camera lens 23 and light source lens 33). It is contemplated that the flap 42 will be so positioned when there is a high probability the work performed by the arm 12 may damage the camera lens 23 and/or light source lens 33. FIG. 2 shown the flap 42 in a second position, wherein the flap 42 is open (i.e., positioned away from the camera lens 23 and light source lens 33). It is contemplated that the flap 42 will be in the second position when there is a low probability that the work performed by the arm 12 may damage the camera lens 23 and/or light source lens 33.

The inside surface of the flap 42 (i.e., the surface that abuts the camera lens 23 and/or light source lens 33 when the flap 42 is closed) may be configured with one or more cushions and/or seals. The cushions and/or seals may be configured to provide a tighter seal between the portion of the casings 20, 30 adjacent the flap 42 and/or to protect the camera lens 23 and/or light source lens 33 during actuation of the flap 42 from the second position to the first position. Alternatively, the casings 20, 30 may be configured with cushions and/or seals adjacent the periphery of the camera lens 23 and/or light source lens 33 to fulfill a similar function.

In another embodiment of the enclosure device 10 not pictured herein, the enclosure device 10 includes two flaps 42, wherein a first flap 42 is positioned adjacent the camera casing 20 and a second flap 42 is positioned the light source casing 30. Each flap 42 is operatively engaged with an actuator 50, such that either flap 42 may be actuated between a first and second position independently from the other flap 42. Such an embodiment may be configured in a manner similar to that shown for the illustrative embodiment of the enclosure device 10, wherein both actuators are parallel with the shutter mounting arm. Furthermore, the flap 42, translator 44, and connector blocks 46 are but one of an infinite number of shutter mechanisms 40, and variations and/or modifications of the illustrative embodiment of the enclosure device 10 will occur to those skilled in the art without departing from the spirit and scope thereof.

The shutter mechanism 40 as disclosed protects both the camera lens 23 and light source lens 33 from damage due to molten weld spatter, sparks, debris, fumes, or other hazards. It also protects the camera lens 23 and light source lens 33 from discoloration and/or obscuring caused by welding fumes or other contaminants that may result from the work of the arm 12. The flap 42 may open to allow the camera 22 to record needed images and then close during work performed by the arm 12. This protection of the camera lens 23 during work of the arm 12 ensures the camera 22 captures an accurate image of consist quality, which is crucial for the arm 12 to function properly. Furthermore, mounting the camera casing 20 and light source casing 30 parallel with respect to one another with the actuator 50 positioned between the casings 20, 30 lends the enclosure device a lower profile. Accordingly, the enclosure device 10 may be positioned closer to the distal end of the arm 12 without concern that mobility of the arm will be decreased, as the arm 12 may still work in small spaces. The enclosure device 10 may be used with any arm 12, and is not limited by whether the arm 12 is robotic or otherwise. Additionally, the enclosure device 10 may be used with a robotic arm 12 that is manipulated by an operator in real-time, or one that is controlled by a preprogrammed computer or other control device to perform a certain function given certain input values and/or conditions.

Figure 7:
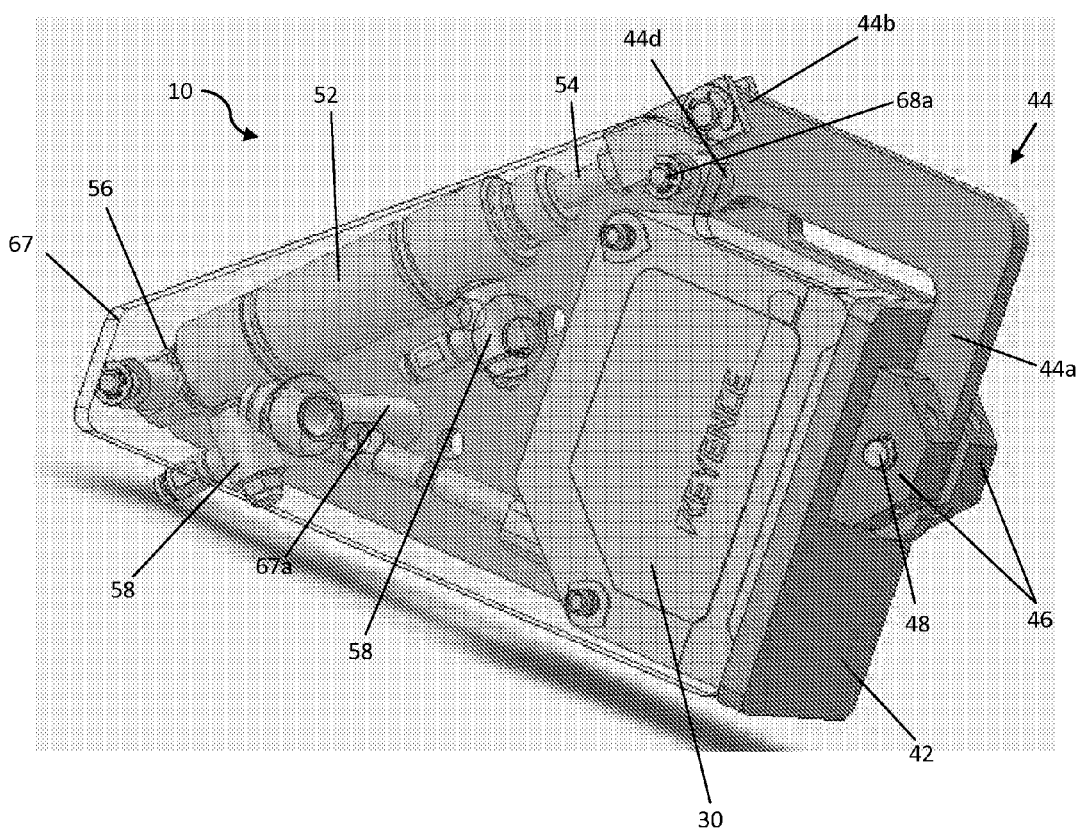
FIG. 7 is a perspective view of a second embodiment of the enclosure device with the shutter closed.
Figure 8:
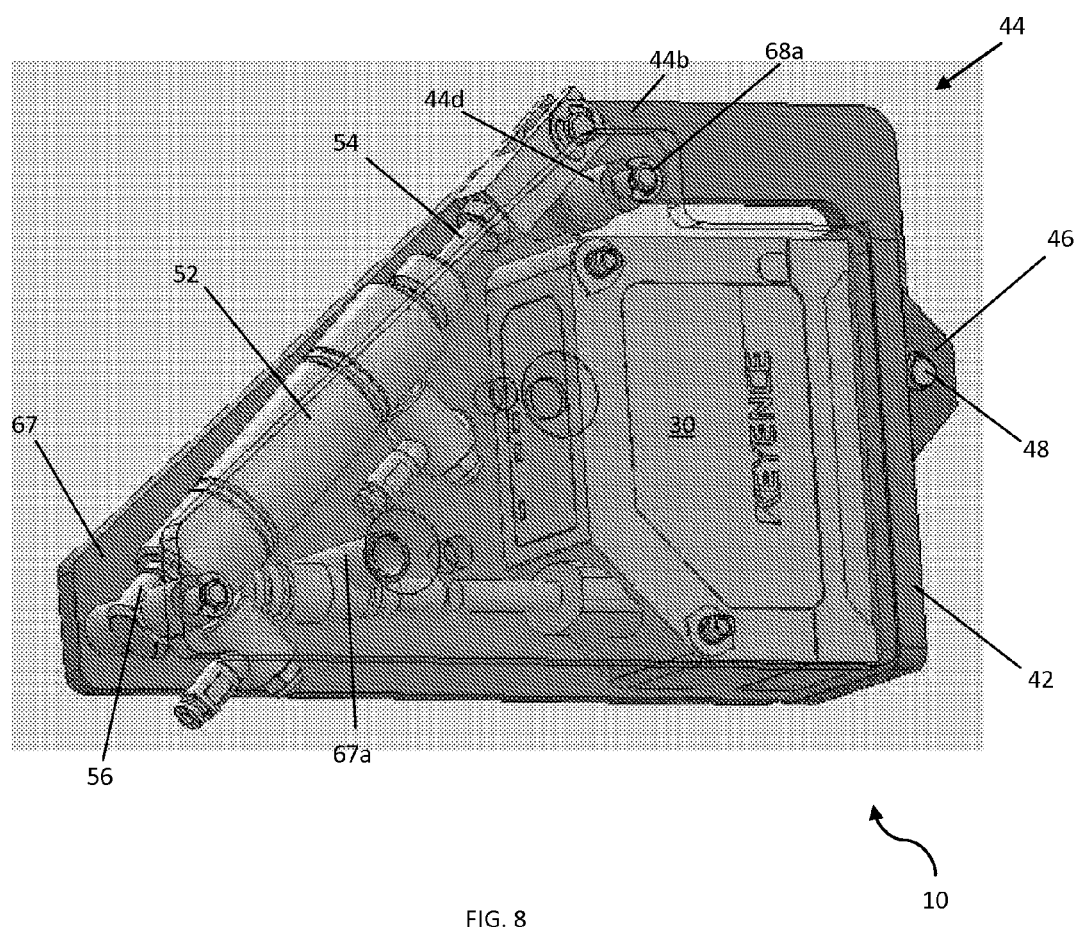
FIG. 8 is a second perspective view of the second embodiment of the enclosure device with the shutter closed.
Figure 9:
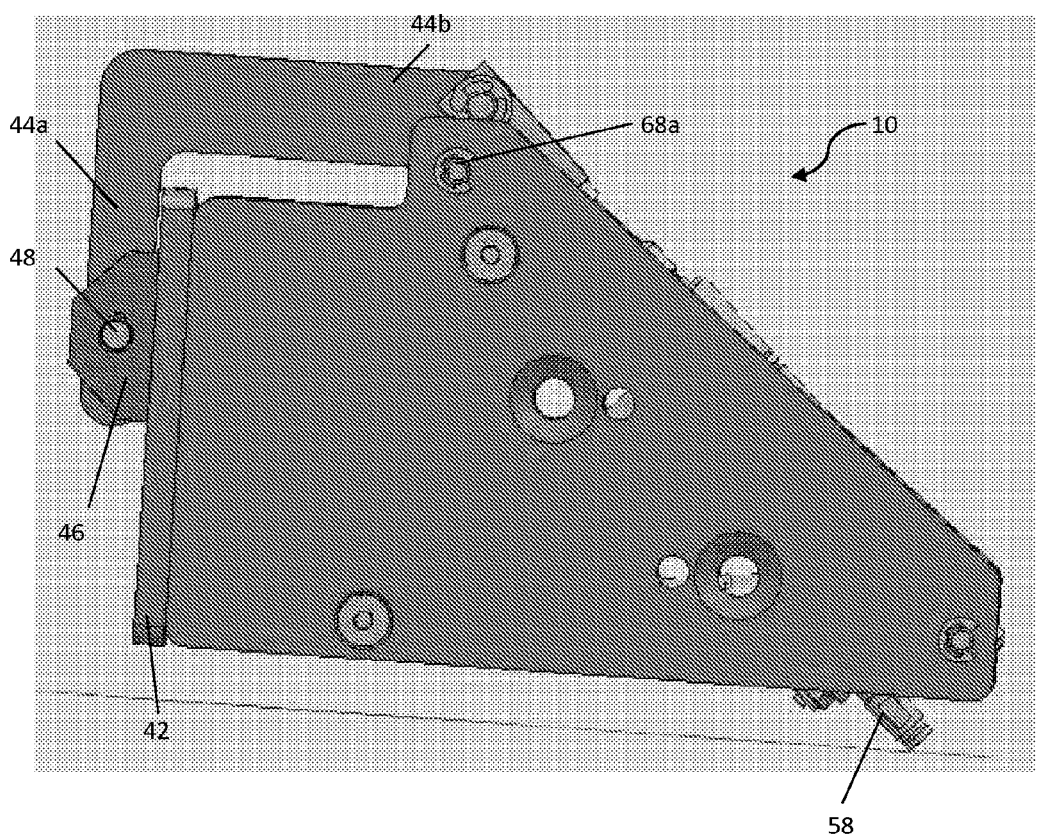
FIG. 9 is a side view of the second embodiment of the enclosure device with the shutter closed.

Another embodiment of an enclosure device in accordance with the present disclosure is shown in FIGS. 7-9. In this embodiment, the flap 42 may be generally rectangular shaped and the side plates 67 may be generally triangular shaped. One or more cross members 67a may extend from one side plate 67 to the other to add rigidity and strength to the enclosure device 10. A light source casing 30 may be sandwiched between two side plates 67 that are generally configured as mirror images of one another. It is contemplated that the second embodiment of the enclosure device 10 may be configured specifically for a light source casing 30 housing a light source 32 configured as a laser designed to measure distances, but such a light source casing 30 and/or light source 32 in no way limits the scope of the enclosure device 10 as disclosed and claimed herein.

Generally, an angled translator 44 may be pivotally mounted to the two side plates 67 via a plate connector 44d. The translator 44 may pivot with respect to the side plates 67 about a translator pivot 68a. An actuator connector 44b may be formed in the translator 44 adjacent the plate connector 44d. A flap connector 44a may be angled with respect to the actuator connector 44b and plate connector 44d to engage at least one connector block 46. One or more connector blocks 46 may be engaged with a flap 42 that covers a portion of the area between the two side plates 67 when in the closed position (as shown in FIGS. 7-9). A connector pin 48 may be used to engage the flap connector 44a and the connector blocks 46.

As with the previous embodiment, an actuator 50 may be positioned within the enclosure device 10 to move the flap 42 between an open and a closed position. The actuator 50 may be pivotally mounted between the side plates 67 at the actuator base 56. The actuator arm 54 may pivotally engage the translator 44 at the actuator connector 44b. Accordingly, when the actuator arm 54 retracts into the actuator body 52, the translator 44 pivots causing the flap connector 44a to move upward from the vantage shown in FIGS. 7-9, thereby opening the flap 42. Conversely, when the actuator arm 54 extends from the actuator body 52, the translator pivots in the opposite direction causing the flap connector 44a to move downward, thereby closing the flap 42.

One or more of the embodiments of enclosure devices 10 disclosed herein may be used alone or in conjunction with other enclosure devices 10. Accordingly, the scope of the enclosure device 10 as disclosed and claim herein is in no way limited by the number of camera casings 20, cameras 22, light source casings 30, light sources 32, flaps 42, translators 44, actuators 50, or any other component of an enclosure device 10.

The optimal dimensions and/or configuration of the camera casing 20, camera lens 23, sealing cap(s) 24 (if present), light source casing 30, light source lens 33, flange(s) 34 (if present), shutter mechanism 40, actuator 50, plate frame 60, actuator mount 63 (if present), rear block 64 (if present), adaptor plate 66 (if present), and shutter mounting arm 68 (if present) will vary from one embodiment of the enclosure device 10 to the next, and are therefore in no way limiting to the scope thereof. The various elements of the enclosure device 10 may be formed of any material that is suitable for the application for which the enclosure device 10 is used. Such materials include but are not limited to aluminum, metal, metallic alloys, aluminum alloys, polymers, other synthetic materials, and/or combinations thereof. However, it is contemplated that in the illustrative embodiment of the enclosure device 10, the various elements will be constructed of aluminum and/or an aluminum alloy that provides the proper balance of weight and structural integrity.

Having described the preferred embodiment, other features, advantages, and/or efficiencies of the enclosure device 10 will undoubtedly occur to those versed in the art, as will numerous modifications and alterations of the disclosed embodiments and methods, all of which may be achieved without departing from the spirit and scope of the enclosure device 10. It should be noted that the enclosure device 10 is not limited to the specific embodiments pictured and described herein, but are intended to apply to all similar apparatuses for protecting a camera lens 23 and/or light source lens 33 at one time while not obscuring the line-of-sight therefore at another time. Modifications and alterations from the described embodiments will occur to those skilled in the art without departure from the spirit and scope of the enclosure device 10.

The invention claimed is:

1. A method of working on a piece of material, said method comprising:
   a. mounting an enclosure device to an arm, wherein said arm is configured to perform work on said piece of material, wherein a camera and a light source are positioned in said enclosure device;
   b. engaging a first portion of an actuator with said enclosure device, wherein said actuator includes an actuator body and an actuator arm, wherein said actuator arm is moveable with respect to said actuator body, and wherein said first portion of said actuator is pivotally engaged with said enclosure device;
   c. engaging a second portion of said actuator with a translator, wherein said second portion of said actuator is pivotally engage with said translator;
   d. engaging said translator with a flap, wherein said translator is configured to communicate mechanical forces from said actuator to said flap;
   e. opening said flap via said actuator by retracting said actuator arm toward said actuator body so as to cause said translator to pivot in a first direction with respect to said enclosure device, which pivoting opens said flap to allow said camera to record at least one image of said piece of material and to allow said light source to collect one measurement,
   f. closing said flap via said actuator by extending said actuator arm away from said actuator body so as to cause said translator to pivot in a second direction with respect to said enclosure device, which pivoting closes said flap to protect a lens mounted in said enclosure device; and
   g. instructing said arm to perform work on said piece of material.

2. The method of working on a piece of material according to claim 1 wherein said work is further defined as welding.

3. The method of working on a piece of material according to claim 2 wherein said arm is further defined as a computer controlled robotic arm.

4. The method according to claim 1 wherein said light source is further defined as a laser.

5. The method according to claim 4 wherein said laser is further defined as a laser configured to measure physical distances.

6. The method according to claim 1 wherein said light source is further defined as a bulb.

7. The method according to claim 1 wherein said flap is further defined as being pivotally engaged with a portion of said enclosure device.

8. The method according to claim 1 wherein said enclosure device is further defined as comprising a camera casing, and wherein said camera is further defined as being positioned in said camera casing.

9. The method according to claim 1 wherein said enclosure device is further defined as comprising a light source casing, and wherein said light source is further defined as being positioned in said light source casing.

10. The method according to claim 1 wherein said lens mounted in said enclosure device is further defined as being positioned adjacent said camera.

11. The method according to claim 1 wherein said lens mounted in said enclosure device is further defined as being positioned adjacent said light source.

12. The method according to claim 1 wherein said lens mounted in said enclosure device is further defined as being positioned adjacent both said camera and said light source.

13. The method according to claim 1 wherein said flap is further defined as being positioned over both a portion of said light source and a portion of said camera when said flap is closed.

14. The method according to claim 1 wherein said camera is further defined as a video camera.

15. The method according to claim 1 wherein said camera is further defined as a still image camera.

* * * * *